United States Patent [19]

Schempp et al.

[11] Patent Number: 4,854,646

[45] Date of Patent: Aug. 8, 1989

[54] RIM FOR A MOTOR VEHICLE WHEEL

[75] Inventors: Ulrich Schempp, Tiefenbronn; Volker Ruehr, Stuttgart, both of Fed. Rep. of Germany

[73] Assignee: Dr. Ing. h.c.F. Porsche Aktiengesellschaft, Stuttgart, Fed. Rep. of Germany

[21] Appl. No.: 131,503

[22] Filed: Dec. 11, 1987

[30] Foreign Application Priority Data

Dec. 12, 1986 [DE] Fed. Rep. of Germany ....... 3642504

[51] Int. Cl.$^4$ .............................................. B60B 21/00
[52] U.S. Cl. ................................. 301/65; 301/6 CS; 301/63 R
[58] Field of Search ................. 301/5 R, 6 CS, 6 WB, 301/6 E, 62, 63 R, 64 R, 64 SD, 65; 188/18 A

[56] References Cited

U.S. PATENT DOCUMENTS

| 1,897,375 | 2/1933 | Greenwald | 301/64 SD |
|---|---|---|---|
| 2,631,897 | 3/1953 | Ewart | 301/65 |
| 3,506,311 | 4/1970 | Nobach | 301/63 R |
| 3,779,611 | 12/1973 | Phillippe | 301/65 |
| 3,952,820 | 4/1976 | Asberg | 301/6 CS X |
| 4,165,131 | 8/1979 | Thompson | 301/65 |
| 4,533,184 | 8/1985 | Muller et al. | 301/63 R |
| 4,624,038 | 11/1986 | Walther | 301/65 X |
| 4,700,813 | 10/1987 | Rath | 301/6 CS X |

FOREIGN PATENT DOCUMENTS

| 1915146 | 11/1969 | Fed. Rep. of Germany . | |
| 1755523 | 8/1971 | Fed. Rep. of Germany . | |
| 2311740 | 9/1974 | Fed. Rep. of Germany | 301/65 |
| 3214875 | 4/1983 | Fed. Rep. of Germany | 301/6 CS |
| 383605 | 2/1931 | United Kingdom | 301/65 |
| 405008 | 1/1934 | United Kingdom . | |
| 445642 | 4/1936 | United Kingdom . | |
| 448635 | 6/1936 | United Kingdom . | |
| 458799 | 12/1936 | United Kingdom . | |
| 763304 | 12/1956 | United Kingdom . | |
| 767953 | 2/1957 | United Kingdom . | |
| 961981 | 6/1964 | United Kingdom . | |
| 1081246 | 8/1967 | United Kingdom . | |
| 1230169 | 4/1971 | United Kingdom | 301/65 |

OTHER PUBLICATIONS

"Gute Fahrt", H-11, Nov. 1981, p. 44.
Advertising Brochure, WVK 103 410, p. 15, lower left illustration.

Primary Examiner—Russell D. Stormer
Attorney, Agent, or Firm—Barnes & Thornburg

[57] ABSTRACT

A rim for a motor vehicle wheel with several through-openings which are arranged on a concentric aperture circle of the wheel circumferentially with respect to a wheel brake and which form air inlet and outlets. The openings are constructed semi-circularly shaped and include an arcuately shaped outer boundary surface and an arcuately shaped inner boundary surface. The outer boundary surface is formed each by a section of the aperture circle and the further inner boundary surface adjoins this section. The arc of this boundary surface extends up to a concentric inner circle of the wheel which has a smaller radius.

14 Claims, 2 Drawing Sheets

RIM FOR A MOTOR VEHICLE WHEEL

BACKGROUND AND SUMMARY OF THE INVENTION

The present invention relates to a rim for a motor vehicle wheel with several through-openings which are arranged on a concentric aperture circle of the wheel circumferentially with respect to a wheel brake and which form air inlets and outlets.

Rims for motor vehicles are known which include several through-openings arranged on a concentric aperture circle. These openings extend near the rim of the wheel flange and are constructed slot-like with two parallel length sides. These openings in the rims effect only a limited rate of air flow and thus an adequate cooling of the wheel brakes is not always assured.

The task of the present invention is to provide a wheel for a motor vehicle whose through-openings assure an optimized rate of air flow.

The advantages principally attained with the present invention consist in that an air stream and a corresponding air exchange from the brake toward the outside and/or toward the inside is assured by the construction of the openings as well as the arrangement thereof. This air flow is so directed by the position of the inner and outer boundary surfaces that the brake, respectively, the brake disk is exposed directly to the air flow.

The inner boundary surfaces of the openings extend up to the outer circumferential edge of the brake disk whereby a direct heat removal is made possible. The outer boundary surfaces are drawn up to near the bead of the wheel flange so that no heat accumulation space can form inside of the wheel dish and the heated air can flow off directly toward the outside without any impairment.

The openings are distributed uniformly over the circumference of the rim in such a manner that ribs are formed between the openings which become wider in the direction toward the wheel center and thus a good stability of the wheels is assured.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein.

DETAILED DESCRIPTION OF THE DRAWINGS

Figure 1:
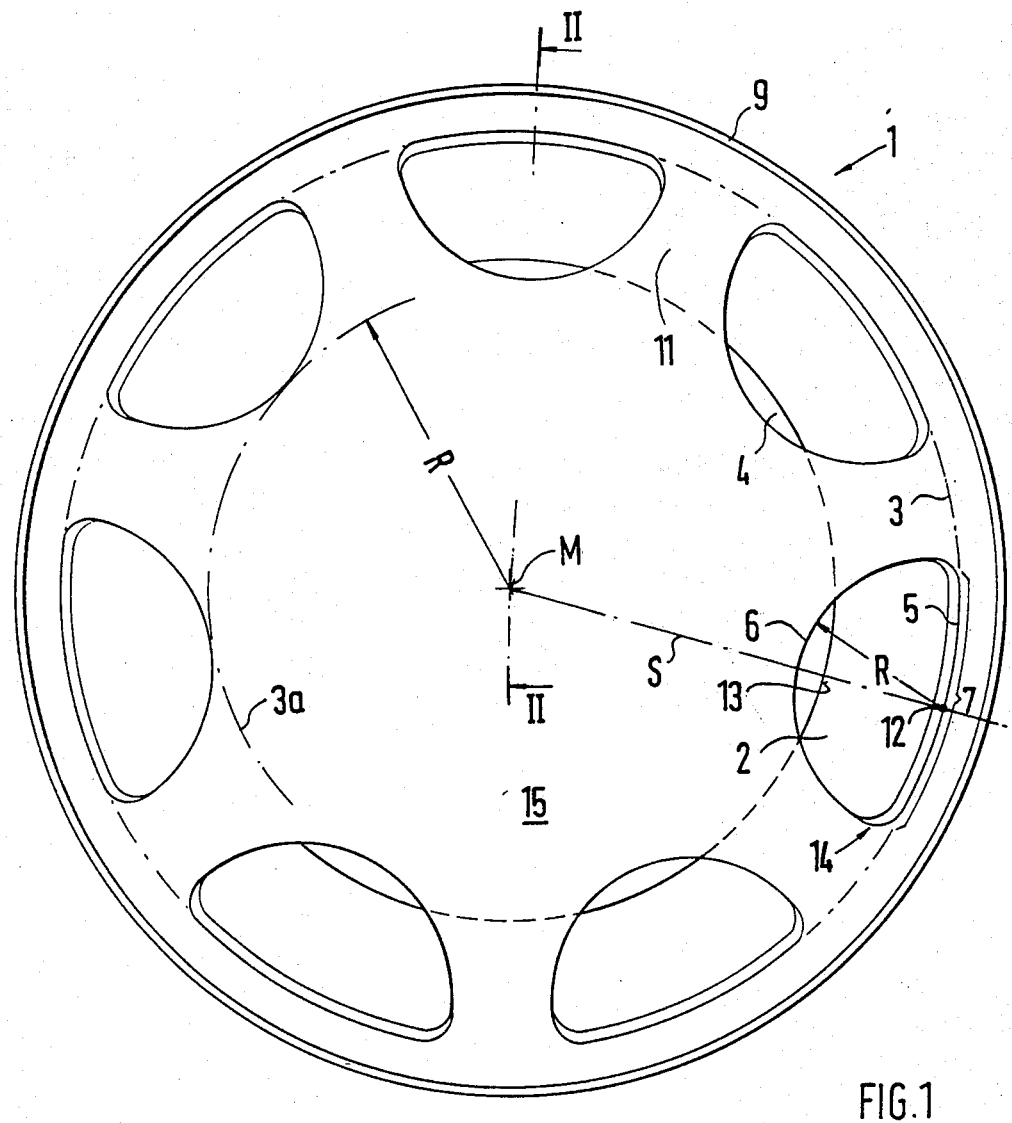
FIG. 1 is a front elevational view on a wheel with semi-circularly shaped openings in accordance with the present invention.
Figure 2:
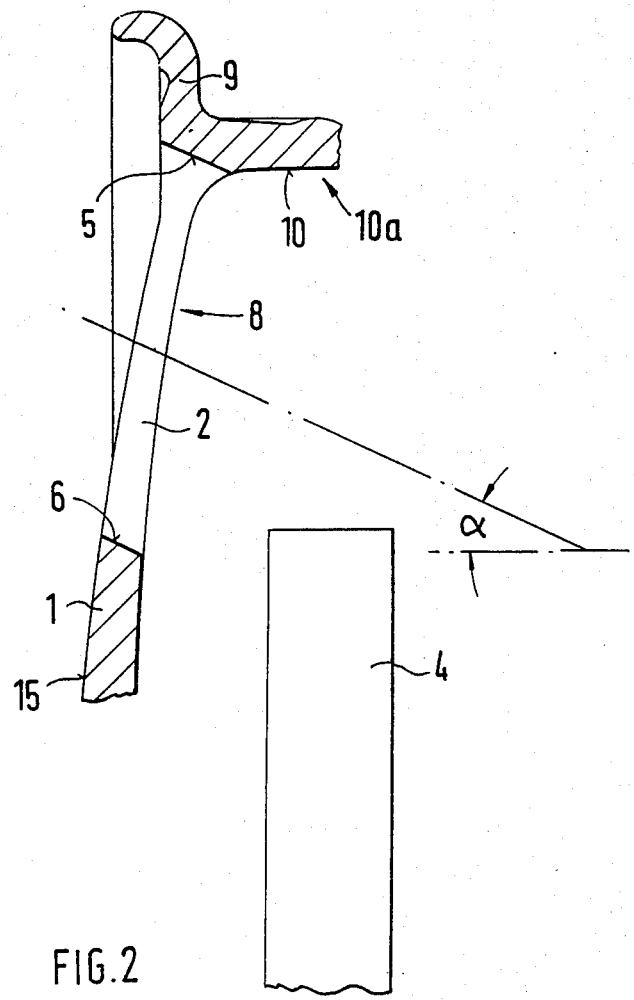
FIG. 2 is a cross-sectional view taken along line II—II of FIG. 1.

Referring now to the drawing wherein like reference numerals are used throughout the two views to designate like parts, a wheel for a motor vehicle includes a rim generally designated by reference numeral 1 with several through-openings 2 which are arranged on a concentric aperture circle 3 of FIG. 1 circumferentially with respect to a brake disk 4.

The openings 2 are constructed of semi-circular shape and include an arcuately shaped outer boundary surface 5 and an arcuately shaped inner boundary surface 6. The outer boundary surface 5 is formed by a section 7 of the aperture circle 3. The inner boundary surface 6 adjoins this section 7, whereby the two boundary surfaces 5 and 6 are connected with each other by way of a rounded-off transition 14.

The boundary surfaces 5 and 6 of the openings 2 are inclined in such a manner that an air guide channel 8 inclined obliquely to the wheel center M under an angle α results which extends up to near the wheel flange 9 and the outer boundary surface of which extends in extension of a surface 10 of the rim dish portion 10a.

The rim 1 includes several openings 2, especially seven openings 2 which are uniformly distributed over the rim 1 and form therebetween ribs 11 which become wider in the direction toward the wheel center M. The ribs 11 are each delimited by the inner boundary surfaces 6 which have a semi-circle with the radius R whose center of circle 12 is preferably located approximately on the concentric aperture circle 3, respectively, on the section 7 of the outer boundary surface 5. The center of circle 12 can also be located displaced inwardly, inside of the opening 2.

The inner boundary surface 6 includes such a radius R that the opening 2 extends up to over the outer edge 13 of the brake disk 4, as shown in FIG. 1, and the opening 2 and the brake disk 4 overlap partially. In particular the semi-circularly shaped inner boundary surface 6 is drawn up to a concentric inner circle 3a.

The front surface 15 of the rim 1 is slightly convexly curved and is located with its highest point approximately in the wheel center M. This convex surface ends in the direction toward the rim flange 9. With a construction of the rim 1 having a concave front surface or a flat front surface, the openings 2 will be arranged also in the manner described hereinabove.

While we have shown and described only one embodiment in accordance with the present invention, it is understood that the present invention is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A motor vehicle wheel rim having a wheel disc, the wheel disc having a front surface, several through-opening means arranged on the front surface of the wheel disc substantially at a concentric aperture circle of the wheel and circumferentially with respect to a wheel brake means and each forming an air inlet and outlet for directing cooling air flow directly onto and away from the wheel brake means, the opening means being constructed of substantially semi-circular shape and include an accurately shaped outer boundary surface and an accurately shaped inner boundary surface, the outer boundary surface being defined by a section of a circle concentric with the wheel rim and located at a rim dish portion of the wheel rim which provides an inner area for a tire placed on the wheel rim while the inner boundary surface adjoins said section, the arc of the inner boundary surface extending up to a substantially concentric inner circle of the wheel which has a predetermined radius, the inner and outer boundary surfaces forming an approximately axial air guide channel with an inclination to the wheel center axis at a predetermined angle, and wherein the inner boundary surface is constructed as semi-circle with a radius whose center point is located approximately at a circumferential mid point of the respective opening taken along a circle concentric with the wheel center point.

2. A wheel rim according to claim 1, wherein the outer boundary surfaces extend on one side above the rim dish portion into a wheel flange portion that holds the tire onto the rim dish portion.

3. A rim according to claim 1, wherein the center point for the radius of the inner boundary surface is located inside of the opening.

4. A rim according to claim 1, wherein the inner boundary surface is constructed as semi-circle with a radius whose center point is located approximately on a radial line between the circumferential mid point of the respective opening and the wheel center point.

5. A rim according to claim 1, wherein the semi-circle includes at the end thereof a rounded-off transition into the outer boundary surface.

6. A rim according to claim 5, wherein the through-opening means are uniformly distributed over the circumference of the wheel and ribs are formed intermediate the openings which become wider in the direction toward the wheel center.

7. A rim according to claim 6, wherein the through-opening means are arranged in an approximately smooth and curved surface of the wheel whereby said surface has a convex shape whose highest point is located within the area of the wheel center.

8. A rim according to claim 7, wherein the inner boundary surface is constructed extending to the area of an outer edge of a brake disk and the area of the opening partially overlaps the brake disk.

9. A rim according to claim 8, wherein the center point for the radius of the inner boundary surface is located inside of the opening.

10. A rim according to claim 1, wherein the center point of said radius is located approximately at the center point of the outer boundary.

11. A rim according to claim 1, wherein the semi-circle includes at the end thereof a rounded-off transition into the outer boundary surface.

12. A rim according to claim 1, wherein the openings are uniformly distributed over the circumference of the wheel and ribs are formed intermediate the openings which become wider in the direction toward the wheel center.

13. A rim according to claim 1, wherein several openings are arranged in an approximately smooth and curved surface of the wheel whereby said surface has a convex shape whose highest point is located within the area of the wheel center.

14. A rim according to claim 1, wherein the inner boundary surface is constructed extending to the area of an outer edge of a brake disk and the area of the opening partially overlaps the brake disk.

* * * * *